United States Patent Office 3,332,957
Patented July 25, 1967

3,332,957
AMINO ESTERS OF SUBSTITUTED PHENOXY ACETIC ACIDS
William Laszlo Bencze, New Providence, N.J., assignor to Ciba Corporation, New York, N.Y., a corporation of Delaware
No Drawing. Filed Sept. 2, 1964, Ser. No. 394,046
7 Claims. (Cl. 260—294.3)

This is a continuation-in-part of application Ser. No. 325,476, filed Nov. 21, 1963, now abandoned.

The present invention concerns phenoxyacetic acid compounds. More especially, it relates to compounds having the formula:

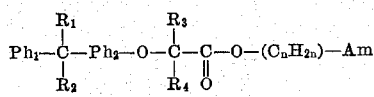

in which $Ph_1$ is a monocyclic carbocyclic aryl radical, each of the groups $R_1$ and $R_2$ is lower alkyl or, when taken together, lower alkylene, $Ph_2$ is a monocyclic carbocyclic arylene radical, each of the groups $R_3$ and $R_4$ is lower alkyl or, when taken together, lower alkylene, the group of the formula $—(C_nH_{2n})—$ is lower alkylene separating the group Am from the oxygen by at least two carbon atoms, and Am is an N,N-disubstituted amino group, or the salts thereof, as well as the N-oxides thereof, the salts of N-oxides thereof or quaternary ammonium compounds thereof; also included within the scope of this invention is a process for the preparation of such compounds.

A monocyclic carbocyclic aryl group representing $Ph_1$, is phenyl or substituted phenyl having one or more than one of the same or of different substituents in any of the positions available for substitution. Substituents are, for example, lower alkyl, e.g. methyl, ethyl, n-propyl, isopropyl, n-butyl and the like, esterified hydroxyl, such as halogeno (representing hydroxyl esterified by a hydrohalic acid), e.g. fluoro, chloro, bromo and the like, trifluoromethyl and the like. Preferred monocyclic carbocyclic aryl radicals are, for example, phenyl, (lower alkyl)-phenyl, (halogeno)-phenyl, (trifluoromethyl)-phenyl and the like.

Each of the groups $R_1$ and $R_2$ stands primarily for lower alkyl, especially methyl, as well as ethyl, n-propyl, isopropyl and the like. When taken together, they may also stand for lower alkylene, having at least two, especially from four to five, carbon atoms, e.g. 1,4-butylene or 1,5-pentylene, as well as 1,2-ethylene, 1,3-propylene and the like.

The monocyclic carbocyclic arylene group $Ph_2$ is especially a monocyclic carbocyclic 1,4-arylene group, as well as a monocyclic carbocyclic 1,2-arylene group and the like, such as phenylene, e.g. 1,4-phenylene, or substituted phenylene, e.g. substituted 1,4-phenylene. Substituted phenylene groups have one or more than one of the same or of different substituents in any of the positions available for substitution. Substituents are, for example, lower alkyl, esterified hydroxyl, such as halogeno, trifluoromethyl and the like; examples of such substituents have been given above. Preferred monocyclic carbocyclic arylene radicals are 1,4-phenylene, (lower alkyl)-1,4-phenylene, (halogeno)-1,4-phenylene, or (trifluoromethyl)-1,4-phenylene.

Each of the groups $R_3$ and $R_4$ stands primarily for lower alkyl, especially methyl, as well as ethyl, n-propyl, isopropyl and the like. When taken together, they may also stand for lower alkylene, having at least two, especially from four to five, carbon atoms, e.g. 1,4-butylene, or 1,5-pentylene, as well as 1,2-ethylene, 1,3-propylene and the like.

The lower alkylene group of the formula $—(C_nH_{2n})—$, separating the group Am from the oxygen atom by at least two, preferably by two to three, carbon atoms, is represented above all by 1,2-ethylene, as well as 1-methyl-1,2-ethylene, 2-methyl-1,2-ethylene, 1,3-propylene and the like.

In an N,N-disubstituted amino group Am, the substituents represent, for example, aliphatic radicals, such as lower alkyl, lower alkenyl and the like, cycloaliphatic radicals, such as cycloalkyl and the like, cycloaliphatic-aliphatic radicals, such as cycloalkyl-lower alkyl and the like, aryl radicals, such as carbocyclic aryl, for example, monocyclic carbocyclic aryl, aryl-aliphatic radicals, such as carbocyclic aryl-aliphatic radicals, for example, monocyclic carbocyclic aryl-lower alkyl and the like, or any other suitable substituents. These radicals have preferably from one to ten carbon atoms, and may be represented, for example, by lower alkyl, e.g. methyl, ethyl, n-propyl, isopropyl, n-butyl, isobutyl, secondary butyl, pentyl, neopentyl and the like, lower alkenyl, e.g. allyl, methylallyl and the like, cycloalkyl having from three to eight, preferably from five to seven, ring carbon atoms, e.g. cyclopropyl, cyclopentyl, cyclohexyl and the like, cycloalkyl-lower alkyl, in which cycloalkyl has from three to eight, preferably from five to seven, ring carbon atoms, e.g. cyclopropylmethyl, cyclopentylmethyl, cyclohexylmethyl, 2-cyclohexylethyl and the like, monocyclic carbocyclic aryl, e.g. phenyl and the like, monocyclic carbocyclic aryl-lower alkyl, such as phenyl-lower alkyl, e.g. benzyl, 1-phenylethyl, 2-phenylethyl and the like, or any other suitable substituent. These radicals may have additional groups as substituents; free hydroxyl, lower alkoxy, e.g. methoxy, ethoxy and the like, lower alkyl-mercapto, e.g. methyl-mercapto, ethylmercapto, or any other suitable group may be attached to such radicals. N,N-di-substituted amino groups are primarily represented by N,N-di-lower alkyl-amino, e.g. N,N-dimethylamino, N-methyl-N-ethylamino, N,N-diethylamino, N,N-di-n-propylamino, N,N-di-isopropylamino and the like, as well as by N-cycloalkyl-N-lower alkyl-amino, in which cycloalkyl has preferably from five to seven ring carbon atoms, e.g. N-cyclopentyl-N-methyl-amino, N-cyclohexyl - N - methyl-amino, N-cyclohexyl-N-ethyl-amino and the like, N-lower alkyl-N-phenyl-lower alkyl-amino, e.g. N-benzyl-N-methyl-amino, N-benzyl-N-ethyl-amino, N-methyl-N-(1-phenylethyl)-amino, N-methyl-N-(2-phenylethyl)-amino and the like, or any othe N,N-di-substituted amino group. N,N-di-substituted amino groups, in which the substituents have functional groups, are, for example, N-hydroxy-lower alkyl-N-lower alkyl-amino, in which hydroxyl is separated from amino by at least two carbon atoms, e.g. N-(2-hydroxyethyl)-N-methyl-amino and the like, N,N-di-hydroxy-lower alkyl-amino, in which hydroxyl is separated from amino by at least two carbon atoms, e.g. N,N-di-(2-hydroxyethyl)-amino and the like.

In an N,N-disubstituted amino group Am, the substituents may be taken together to form a divalent radical. Such N,N-di-substituted amino groups are, for example, 1-N,N-alkylene imino, in which alkylene has from four to eight carbon atoms, 1-N,N-aza-alkylene-imino groups, in which alkylene has from four to six carbon atoms, and the two nitrogen atoms are separated by at least two carbon atoms, or 1-N,N-oxa-alkylene-imino and 1-N,N-thia-alkylene-imino, in which alkylene has preferably four carbon atoms, and the nitrogen atom is separated from the ring-oxygen atom and the ring-sulfur atom, respectively, by two carbon atoms. Together with the nitrogen atom such alkylene, aza-alkylene, oxa-alkylene or thia-alkylene radicals represent, for example, 1-N,N-alkylene-imino, in which alkylene has from four to eight carbon atoms, e.g. 1-pyrrolidino, 2-methyl-1-pyrrolidino, 1-piperidino, 2- methyl-1-piperidino, 4-methyl-1-piperidino, 3-hydroxy-1-piperidino, 3-acetoxy-1-piperidino, 3-hydroxymethyl-1-piperidino, 1-N,N-(1,6-hexylene)-imino, 1-N,N-(1,7-heptylene)-imino, 1-N,N-(1,8-octylene)-imino and the like, 1-N,N-(aza-alkylene)-imino, in which alkylene has from four to six carbon atoms and the two nitrogens are separated by at least two carbon atoms, particularly 1-N,N-(N-lower alkyl-aza-alkylene)-imino, in which alkylene has from four to six carbon atoms and the two nitrogens are separated by at least two carbon atoms, such as 1-piperazino, particularly 4-lower alkyl-1-piperazino, e.g. 4-methyl-1-piperazino, 4-ethyl-1-piperazino and the like, as well as 4-hydroxyethyl-1-piperazino, 4-acetoxyethyl-1-piperazino and the like, 1-N,N-(3-aza-1,6-hexylene)-imino, particularly 1-N,N-(3-aza-3-lower alkyl-1,6-hexylene)-imino, e.g. 1 - N,N-(3-aza-3-methyl-1,6-hexylene)-imino and the like, or 1-N,N-(4-aza-1,7-heptylene)-imino, particularly 1-N,N-(4-aza-4-lower alkyl-1,7-heptylene)-imino, e.g. 1-N,N-(4-aza-4-methyl-1,7-heptylene)-imino and the like, as well as 4-morpholino, 4-thiamorpholino and the like.

Salts of the compounds of this invention are acid addition salts, such as the pharmaceutically acceptable, non-toxic acid addition salts, for example, those with inorganic acids, e.g. hydrochloric, hydrobromic, sulfuric, phosphoric, nitric acids and the like, or with organic acids, such as organic carboxylic acids, e.g. acetic, propionic, pivalic, glycolic, lactic, succinic, methylsuccinic, maleic, malic, tartaric, citric, benzoic, salicyclic, 4-aminosalicyclic, 2-phenoxybenzoic, 2-acetoxybenzoic, nicotinic, isonicotinic acid and the like, or with organic sulfonic acids, e.g. methane sulfonic, ethane sulfonic, ethane 1,2-disulfonic, 2-hydroxyethane sulfonic, p-toluene sulfonic, naphthalene 2-sulfonic acid and the like. Acid addition salts may also serve as intermediates, for example, for the manufacture of other acid addition salts, or the purification of the free compounds, as well as for identification and characterization purposes. Salts primarily prepared for the latter are, for example, those with acidic organic nitro compounds, e.g. picric, picrolonic, flavianic acid and the like, metal complex acids, e.g. phosphotungstic, phosphomolybdic, chloroplatinic, Reinecke acid and the like, or any other equivalent acids.

Also included within the scope of this present invention are the N-oxides of the compounds of this invention, as well as acid addition salts of such N-oxides.

Quaternary ammonium derivatives of the compounds of this invention are those formed with the reactive esters of alcohols and strong acids. They are represented primarily by lower alkyl, e.g. methyl, ethyl, n-propyl, isopropyl and the like, or phenyl-lower alkyl, e.g. benzyl, 1-phenylethyl, 2-phenylethyl and the like, quaternary ammonium salts, such as halides, e.g. chloride, bromide, iodide and the like, sulfates, or sulfonates, such as lower alkane sulfonates, e.g. methane sulfonate, ethane sulfonate and the like, hydroxy-lower alkane sulfonates, e.g. 2-hydroxy-ethane sulfonate and the like, monocyclic carbocyclic aryl sulfonates, e.g. p-toluene sulfonate and the like, or any other reactive ester of an alcohol. Also included as quaternary ammonium compounds are the corresponding quaternary ammonium hydroxides, and the salts of such hydroxides with acids, other than hydrohalic, sulfuric or sulfonic acids.

The compounds of this invention may be in the form of mixtures of isomers, such as racemates, or of the single isomers, such as the optically active antipodes.

It has been found that the compounds of this invention cause an enlargement of the liver due to an increase in size and number of liver cells. The compounds of this invention are therefore useful as liver-protecting agents, for example, against liver poisoning caused by chemicals, e.g. carbon tetrachloride and the like, or disease, e.g. liver cirrhosis and the like.

It has also been observed, that the compounds of this invention shorten the duration of the pharmacological effects caused by barbiturate compounds, and analogs thereof, and are, therefore, useful in limiting barbiturate-induced sleep.

The compounds of this invention also cause a reduction of the blood cholesterol levels of hypercholesterolemic animals, and are, therefore, useful in lowering the cholesterol level in the body, thus bringing about an amelioration of syndromes connected with arteriosclerosis, atherosclerosis and similar conditions.

Particularly useful are the compounds of the formula

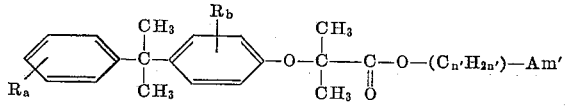

in which each of the groups $R_a$ and $R_b$ is hydrogen or halogeno, the group of the formula $—(C_{n'}H_{2n'})—$ is lower alkylene having from two to three carbon atoms and separating the group $Am'$ from the oxygen atom by two to three carbon atoms, and the group $Am'$ is N,N-di-lower alkyl-amino or N,N-alkylene-imino having from five to seven ring members, and the acid addition salts, particularly the pharmaceutically acceptable, non-toxic acid addition salts thereof. These compounds are especially represented by those of the formulae

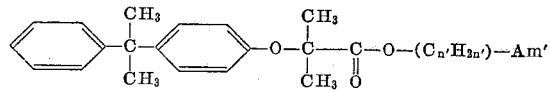

and

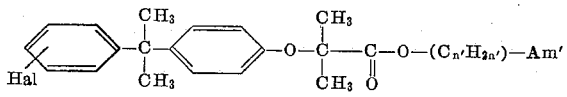

in which $Am'$ and the group of the formula

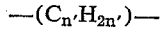

have the previously-given meaning, and Hal is halogeno, or acid addition salts, particularly pharmaceutically acceptable, non-toxic acid addition salts, thereof.

The new compounds of this invention are useful in the form of compositions for enteral, e.g. oral, or parenteral use, which contain the new compounds in admixture with an organic or inorganic, solid or liquid carrier. For making up the preparations there are employed carrier substances, such as water, gelatine, lactose, glucose, corn starch, wheat starch, stearic acid, magnesium stearate, calcium stearate, talc, vegetable oils, stearyl alcohol, benzyl alcohols, tragacanth, gums, acacia, propylene glycol, polyalkylene glycols or any other known carrier materials. The compositions may be in solid form, for example, as capsules, tablets, dragees and the like, or in liquid form, for example, as solutions, suspensions, emulsions and the like. If desired, they may contain auxiliary substances, such as preserving, stabiliziing, wetting, emulsifying, coloring, flavoring agents and the like, salts for varying the osmotic pressure, buffers, etc. They are prepared according to known procedures, and, if desired, may contain, in combination, other useful substances.

The compounds of this invention are prepared according to methods known per se. I prefer to manufacture these compounds by converting in a compound of the formula:

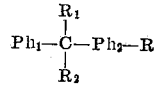

in which $Ph_1$, $Ph_2$, $R_1$ and $R_2$ have the previously-given meaning, and R is a substituent capable of being converted into the group of the formula:

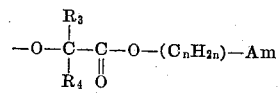

in which $R_3$, $R_4$, $Am$ and the group of the formula

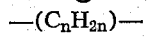

have the previously-given meaning, or a salt thereof, the group R into the group of the formula:

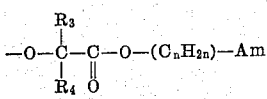

in which $R_3$, $R_4$, Am and the group of the formula

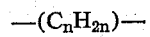

have the above-given meaning, and, if desired, converting in a resulting compound a group of the formula

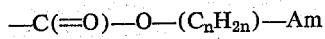

into another group of the formula

in which Am and the group of the formula $—(C_nH_{2n})—$ have the previously-given meaning, and/or, if desired, converting a resulting salt into the free compound or into another salt, and/or, if desired, converting a resulting compound into an N-oxide or a quaternary ammonium compound thereof, and/or, if desired, converting a resulting compound or an N-oxide into a salt thereof, and/or, if desired, converting a quaternary ammonium compound into another quaternary ammonium compound, and/or, if desired, separating a resulting mixture of isomers into the single isomers.

A group R capable of being converted into the desired group of the formula

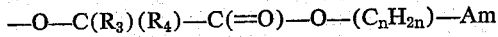

in which $R_3$, $R_4$, Am and the group of the formula

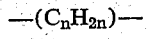

have the previously-given meaning, is hydroxyl. Conversion of a hydroxyl group into the desired group of the formula

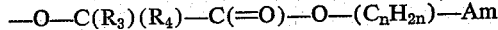

in which $R_3$, $R_4$, Am and the group of the formula $—(C_nH_{2n})—$ have the previously-given meaning, is carried out according to known methods. For example, the starting material having the phenolic hydroxyl group may be converted into a salt, particularly a metal salt, such as an alkali metal, e.g. lithium, sodium, potassium and the like salt. Formation of the metal compound may be achieved, for example, by reacting the starting material with a metal compound-forming reagent, such as an alkali metal hydride or amide, e.g. lithium hydride, sodium hydride, sodium amide, potassium amide and the like, an alkali metal lower alkoxide, e.g. lithium, sodium or potassium methoxide, ethoxide, tertiary butoxide and the like, an alkali metal compound of a hydrocarbon, e.g. butyl lithium, phenyl lithium, phenyl sodium and the like, a metal carbonate, e.g. lithium, sodium or potassium carbonate or hydrogen carbonate and the like, a metal hydroxide, e.g. sodium hydroxide, potassium hydroxide, calcium hydroxide and the like, or any other analogous reagent. The preparation of the metal compounds is carried out in the presence of a solvent selected on the basis of the physicochemical characteristics, e.g. solubility and the like, of the starting material, as well as the reactivity of the metal compound-forming reagent; suitable solvents are, for example, hexane, benzene, toluene, xylene, diethyl ether, p-dioxane, tetrahydrofuran, diethyleneglycol dimethylether, N,N-dimethylformamide and the like, or any other proper solvent, such as a lower alkanol, e.g. methanol, ethanol and the like, or solvent mixture.

The starting material, particularly the salt thereof, is then reacted with a compound of the formula:

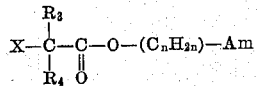

in which $R_3$, $R_4$, Am and the group of the formula $—(C_nH_{2n})—$ have the previously-given meaning, and X stands for a reactive esterified hydroxyl group, or an acid addition salt thereof, for example, a salt with an inorganic acid, such as a salt with a hydrohalic acid and the like. A reactive esterified hydroxyl group is above all esterified with a strong mineral acid, particularly a hydrohalic acid, e.g. hydrochloric, hydrobromic acid and the like; group X represents, therefore, primarily halogeno, e.g. chloro, bromo and the like. Other suitable inorganic acids furnishing a reactive esterified hydroxyl group are, for example, sulfuric acid and the like, as well as strong organic sulfonic acids, such as lower alkane sulfonic acids, e.g. methane sulfonic, ethane sulfonic acid and the like, or monocyclic carbocyclic aryl-sulfonic acids, e.g. p-toluene sulfonic acid and the like, and group X may, therefore, also be lower alkyl-sulfonyloxy, e.g. methylsulfonyloxy, ethylsulfonyloxy and the like, or monocyclic carbocyclic aryl-sulfonyloxy, e.g. 4-methyl-phenyl-sulfonyloxy and the like. The preferred reactive esters used as the reagents in the reaction are those of the formula

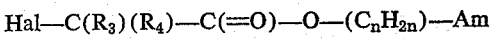

in which $R_3$, $R_4$, Am and the group of the formula $—(C_nH_{2n})—$ have the previously-given meaning, and Hal is halogeno, having preferably an atomic weight greater than 19, and representing above all chloro or bromo, or salts thereof with a hydrophalic acid.

The reaction of the starting material, particularly a metal compound thereof, with the reactive ester reagent is carried out in a suitable diluent, for example, the solvent used for the preparation of the salt, which, however, may be replaced by or diluted with another solvent. If necessary, it is performed while cooling or at an elevated temperature, and/or, in the atmosphere of an inert gas, e.g. nitrogen.

The formation of the metal salt of the starting material may also be carried out in situ, i.e. the starting material having a phenolic hydroxyl group and the reagent having a reactive esterified hydroxyl group are reacted together in the presence of a salt-forming reagent, or of another suitable base.

The conversion of a free hydroxyl group in the starting material into the group of the formula

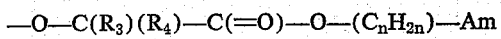

in which $R_3$, $R_4$, Am and the group of the formula $—(C_nH_{2n})—$ have the previously-given meaning, may also be carried out by reacting the above starting material with a compound of the formula:

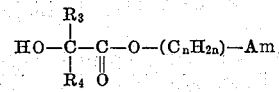

in which $R_3$, $R_4$, Am and the group of the formula $—(C_nH_{2n})—$ have the previously-given meaning, in the presence of a di-substituted carbonate, for example, a diaryl carbonate, e.g. diphenyl carbonate and the like, or especially a di-lower alkyl carbonate, e.g. dimethyl carbonate, diethyl carbonate and the like. The above reaction is carried out at an elevated temperature, ranging from about 100° to about 210°, preferably from about 180° to about 200°, if desired, in the presence of a catalyst, e.g. sodium carbonate, potassium carbonate, a sodium lower alkoxide and the like, and preferably in the absence, as well as in the presence, of a diluent.

A further substituent R, capable of being converted into the group of the formula

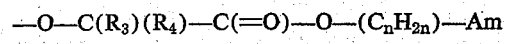

in which $R_3$, $R_4$, Am and the group of the formula $—(C_nH_{2n})—$ have the previously-given meaning, is the group of the formula $—O—C(=O)—Y$, in which Y is halogeno, particularly chloro or bromo, or etherified hylroxyl, primarily lower alkoxy, e.g. methoxy, ethoxy and the like, as well as phenyloxy and the like.

A starting material having such substituent is reacted with a compound of the formula:

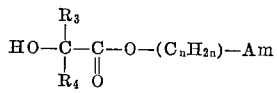

in which $R_3$, $R_4$, Am and the group of the formula $-(C_nH_{2n})-$ have the previously-given meaning. Such reaction is carried out according to known methods, preferably at temperatures ranging from 100–210°, if desired, in the presence of a suitable transesterification catalyst, e.g. sodium carbonate, potassium carbonate and the like, and in the absence, as well as in the presence, of a suitable diluent.

The preferred substituent R capable of being converted into the group of the formula

in which $R_3$, $R_4$, Am and the group of the formula $-(C_nH_{2n})-$ have the previously-given meaning, is the group of the formula $-O-C(R_3)(R_4)-C(=O)-OH$, in which $R_3$ and $R_4$ have the previously-given meaning. Conversion of the carboxyl group into the desired esterified carboxyl group is carried out according to known esterification procedures. For example, a starting material having the substituent with the free carboxyl group, preferably a salt thereof, may be reacted with a reactive ester of an N,N-disubstituted amino-lower alkanol of the formula $X-(C_nH_{2n})-Am$, in which Am, X and the group of the formula $-(C_nH_{2n})-$ have the previously-given meaning, or a salt thereof.

A salt of the starting material having a free carboxyl group is a metal salt, particularly an alkali metal, e.g. lithium, sodium, potassium and the like, salt thereof. Formation of the salt is achieved according to the previously-described procedure. The reactive ester of the previously-described reagent is above all an ester with a strong mineral acid, such as a hydrohalic acid, e.g. hydrochloric, hydrobromic acid and the like, and the group X represents primarily halogeno, e.g. chloro, bromo and the like; other suitable acids furnishing a reactive esterified hydroxyl group are, for example, sulfuric acid, or any of the previously-mentioned strong organic sulfonic acids. The preferred reactive esters used as the reagents in the above reaction are those having the following formula: $Hal-(C_nH_{2n})-Am$, in which Am, Hal and the group of the formula $-(C_nH_{2n})-$ have the previously-given meaning, or a salt thereof. Salts of such reagents are acid addition salts, such as those with hydrohalic acids and the like.

The reaction of the starting material, particularly a metal compound thereof, with the reactive ester reagent is carried out as previously described; if desired, the formation of the metal salt of the starting material may also be carried out in situ, i.e. the starting material having a carboxyl group and the reagent having a reactive esterified hydroxyl group or a salt thereof are reacted together in the presence of a metal salt-forming reagent, or of any other suitable base.

The conversion of the carboxyl group in the above starting material having the substituent of the formula $-O-C(R_3)(R_4)-C(=O)-OH$ into the desired group of the formula $-C(=O)-O-(C_nH_{2n})-Am$ is also carried out by converting the carboxyl group into a reactive derivative thereof, such as a carboxylic acid halide, e.g. chloride and the like (for example, by treatment with a thionyl halide, e.g. thionyl chloride and the like, a phosphorus halide, e.g. phosphorus tribromide and the like), or a carboxylic acid ester other than an N,N-disubstituted amino-lower alkyl ester, such as a lower alkyl ester (manufactured, for example, by esterifying the starting material with a free carboxyl group with a lower alkanol, or obtained as an intermediate in the manufacture of the starting material, in which the group R has the formula $-O-C(R_3)(R_4)-C(=O)-OH$), and treating the resulting intermediate having a reactive converted carboxyl group with an N,N-disubstituted amino-lower alkanol of the formula $HO-(C_nH_{2n})-Am$, in which Am and the group of the formula $-(C_nH_{2n})-$ have the previously-given meaning, or a salt thereof, if necessary, in the presence of a suitable reagent. If desired, the starting material having a carboxylic acid halide group is reacted with the N,N-disubstituted amino-lower alkanol or an acid addition salt thereof in the presence of a base, such as an alkali metal carbonate and the like, or with an alkali metal salt of the N,N-disubstituted amino-lower alkanol, which may also be formed in situ. A starting material having an esterified carboxyl group is reacted with the N,N-disubstituted amino-lower alkanol in the presence of a transesterification reagent, such as the corresponding metal, e.g. alkali metal, alkaline earth metal, aluminum and the like, N,N-disubstituted amino-lower alkoxide, an alkali metal cyanide, a quaternary ammonium hydroxide, e.g. N-benzyl-N,N,N-trimethyl-ammonium hydroxide and the like, or any other suitable reagent.

The starting material used in the procedure of this invention is known or may be obtained according to known methods. Thus, a compound having the formula $Ph_1-C(R_1)(R_2)-OH$, in which $Ph_1$, $R_1$ and $R_2$ have the previously-given meaning, may be reacted with a phenolic compound of the formula $H-Ph_2-OH$, in which $Ph_2$ has the previously-given meaning, in the presence of a suitable Lewis acid reagent, particularly of a Friedel-Crafts reagent, e.g. aluminum chloride and the like. In a resulting compound of the formula $$Ph_1-C(R_1)(R_2)-Ph_2-OH$$

in which $Ph_1$, $Ph_2$, $R_1$ and $R_2$ have the previously given meaning, the phenolic hydroxyl group may be converted into the group of the formula $-O-C(=O)-Y$, in which Y has the previously-given meaning, according to known methods. The phenolic hydroxyl group may also be converted into the group of the formula $$-O-C(R_3)(R_4)-C(=O)-OH$$

according to the previously-described procedure, i.e. by reacting a metal salt of the starting material with a compound of the formula $X-C(R_3)(R_4)-C(=O)-O-R_\circ$, in which X, $R_3$ and $R_4$ have the previously-given meaning, and $R_\circ$ is either hydrogen or, more especially, an aliphatic radical, particularly lower alkyl, and, if necessary, converting in a resulting compound having a substituent of the formula $$-O-C(R_3)(R_4)-C(=O)-O-R_\circ'$$

in which $R_\circ'$ is an aliphatic radical, the group $R_\circ'$ into hydrogen by hydrolysis with a base, e.g. an alkali metal hydroxide, or by reacting the starting material with the phenolic hydroxyl group with a ketone of the formula $R_3-CO-R_4$, in which each of the groups $R_3$ and $R_4$ has the above-given meaning, in the presence of a trihalogenated methane derivative, e.g. chloroform and the like, or with a tetrahalogenated methane derivative, e.g. carbon tetrachloride and the like, and of a strong base, such as an alkali metal hydroxide, e.g. sodium hydroxide, potassium hydroxide and the like, which is preferably used in solid form.

In a resulting compound, the group of the formula $-C(=O)-O-(C_nH_{2n})-Am$, in which Am and the group of the formula $-(C_nH_{2n})-$ have the previously-given meaning, may be converted into another group of the formula $-C(=O)-O-(C_nH_{2n})-Am$ by transesterification, for example, by treatment with an alcohol of the formula $HO-(C_nH_{2n})-Am$, in which Am and the group of the formula $-(C_nH_{2n})-$ have the previously-given meaning, in the presence of a transesterification reagent, for example, the corresponding metal, e.g. alkali metal, alkaline earth metal or aluminum alcoholate, an alkali metal cyanide, benzyl trimethyl ammonium hydroxide and the like.

A resulting salt may be converted into the free compound, for example, by treatment with an alkaline reagent, such as a metal hydroxide, e.g. lithium hydroxide, sodium hydroxide, potassium hydroxide, calcium hydroxide and the like, metal carbonate, e.g. sodium, potassium or calcium carbonate or hydrogen carbonate and the like, ammonia, or any other appropriate alkaline reagent, as well as a suitable hydroxyl ion exchange resin.

A resulting salt may be converted into another salt according to known methods; for example, the salt with an inorganic acid may be reacted with a metal salt, e.g. sodium, barium, silver and the like, salt of an acid in the presence of a diluent, in which a resulting inorganic compound is insoluble and is thus removed from the reaction medium. Conversion of one salt into another is also achieved by treatment with a suitable anion exchange preparation.

A resulting free compound may be converted into an acid addition salt by reacting it with an acid, such as one of those mentioned above. The salt-forming reaction may be carried out, for example, by treating a solution of the free compound in the presence of a solvent or solvent mixture, with an appropriate acid or a solution thereof, or an anion exchange preparation, and isolating the desired salt, which may also be obtained in the form of hydrates thereof or may contain solvent of recrystallization.

N-oxides of the compounds of this invention are prepared according to known methods, for example, by treating a resulting compound, preferably in an inert solvent, with an N-oxidizing reagent, such as, for example, ozone, hydrogen peroxide, inorganic peracids, e.g. persulfuric acid and the like, organic persulfonic acids, e.g. p-toluene persulfonic acid and the like, or primarily organic percarboxylic acids, e.g. peracetic acid, perbenzoic acid, monoperphthalic acid and the like. The N-oxides may be obtained in the form of the free compounds or the acid addition salts thereof; a free N-oxide compound may be converted into its acid addition salt, or an N-oxide salt may be converted into the free N-oxide base according to the previously-described procedures.

Quaternary ammonium derivatives of the compounds of this invention are obtained, for example, by reacting the resulting compound with a reactive ester of alcohol, such as a lower alkyl halide, e.g. methyl, ethyl, n-propyl or isopropyl chloride, bromide or iodide and the like, a di-lower alkyl sulfate, e.g. dimethyl sulfate, diethyl sulfate and the like, a lower alkyl lower alkane sulfonate, e.g. methyl or ethyl methane sulfonate or ethane sulfonate and the like, a lower alkyl carbocyclic aryl sulfonate, e.g. methyl p-toluene sulfonate and the like, a phenyl-lower halide, e.g. benzyl, 1-phenylethyl or 2-phenylethyl chloride or bromide and the like, or any other analogous reactive ester reagent. The quaternizing reaction may be performed in the absence or presence of a solvent, under cooling, at room temperature or at an elevated temperature, at atmospheric pressure or in a closed vessel under pressure, and, if desired, in the atmosphere of an inert gas, e.g. nitrogen.

A resulting quaternary ammonium compound may be converted into another quaternary ammonium compound, such as a quaternary ammonium hydroxide, for example, by reacting a quaternary ammonium halide with silver oxide, or a quaternary ammonium sulfate with barium hydroxide, by treating a quaternary ammonium salt with a hydroxyl ion exchange resin, by electrodialysis or any other suitable means. From a resulting quaternary ammonium hydroxide there may be obtained quaternary ammonium salts by reacting the quaternary ammonium hydroxide compound with an acid, for example, one of those used for the preparation of acid addition salts. A quaternary ammonium compound may also be converted directly into another quaternary ammonium salt without the formation of an intermediate quaternary ammonium hydroxide. For example, a quaternary ammonium iodide may be reacted with freshly prepared silver chloride, or with hydrochloric acid in anhydrous methanol; a quaternary ammonium compound may also be converted into another quaternary ammonium compound by treatment with a suitable anion exchange preparation.

A resulting mixture of isomeric compounds may be separated into the single isomers according to known methods. For example, a racemate may be resolved into the optically active forms, the levo-rotatory *l*-form and the dextro-rotatory *d*-form according to known resolution methods. For example, to the solution of the free base of a racemate (a *d*, *l*-compound) in a suitable solvent or solvent mixture is added one of the optically active forms of an acid, containing an asymmetric carbon atom, or a solution thereof. Especially useful as optically active forms of salt-forming acids, having the asymmetric carbon atom are the *d*-tartaric acid (L-tartaric acid) and the *l*-tartaric acid (D-tartaric acid); the optically active forms of di-benzoyl-tartaric, di-p-toluyl-tartaric, malic, mandelic, 10-camphor sulfonic acid, quinic acid and the like, may also be used. Salts formed with one of the optically active forms of the acid may then be separated on the basis of physico-chemical differences, e.g. different solubilities and the like. The free and optically active base may be obtained from the resulting salt according to the methods described above, and an optically active base may be converted into its acid addition salt, an N-oxide thereof or a quaternary ammonium compound thereof as described hereinbefore.

The invention also comprises any modification of the process wherein a compound obtainable as an intermediate at any stage of the process is used as starting material and the remaining step(s) of the process is(are) carried out. It also includes any new intermediates which may be formed in one of the procedures outlined hereinbefore.

In the process of this invention such starting materials preferably are used which lead to final products mentioned in the beginning as preferred embodiments of the invention.

The following examples are intended to illustrate the invention and are not to be construed as being limitations thereon. Temperatures are given in degrees centigrade.

*Example 1*

A mixture of 6.0 g. of 2-[4-(2-phenyl-2-propyl)-phenyloxy]-isobutyric acid, 3.8 g. of 2-N,N-diethylaminoethyl chloride hydrochloride and 3.2 g. of anhydrous potassium carbonate in 120 ml. of ethyl acetate is refluxed for twenty-four hours. The solid material is filtered off and washed twice with ethyl acetate. The filtrates are combined and evaporated to dryness; the half-solid residue is triturated with diethyl ether. The solid material, representing 0.95 g. of the starting material, is filtered off, and the filtrate is treated with a saturated solution of hydrogen chloride in diethyl ether. The resulting precipitate representing the hydrochloride of 2-N,N-diethylaminoethyl 2-[4-(2-phenyl-2-propyl)-phenyloxy]-isobutyrate of the formula:

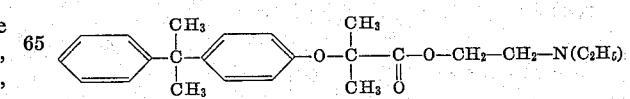

is hygroscopic and is reconverted into the free compound by decanting the solvent, adding fresh diethyl ether and then a saturated aqueous solution of sodium hydrogen carbonate. The aqueous phase is extracted with diethyl ether; the organic solutions are combined, washed with a saturated aqueous solution of sodium chloride, dried over sodium carbonate and evaporated to dryness to yield 4.6 g. of the desired 2-N,N-diethylaminoethyl 2-[4-(2-phenyl-2-propyl) - phenyloxy]-isobutyrate obtained as a viscous oil.

The desired compound is further purified by placing a solution of 4.6 g. of 2-N,N-diethylaminoethyl 2-[4-(2-phenyl-2-propyl)-phenyloxy]-isobutyrate in 10 ml. of a 1:1-mixture of hexane and benzene on a column containing 150 g. of aluminum oxide (Woelm, activity III, neutral) and eluting the following fractions:

| Fraction | Solvent | Product, g. |
|----------|---------|-------------|
|   | 2:1 mixture of hexane and benzene | 1.1 |
|   | 1:1 mixture of hexane and benzene | 1.1 |
|   | Benzene | 0.9 |
|   | Diethyl ether | 0.16 |

Fraction 4 is discarded, and Fraction 2 is distilled to yield the analytically pure 2-N,N-diethylaminoethyl 2-[4-2-phenyl-2-propyl)-phenyloxy] - isobutyrate, which is collected at 135–138°/0.02 mm. It analyzes as follows:
Calcd. for $C_{25}H_{35}NO_3$: C, 75.53; H, 8.87. Found: C, 75.59; H, 8.89.

The starting material used in the above procedure is prepared as follows: To a solution 10.0 g. of 2-(4-hydroxyphenyl)-2-phenyl-propane in a mixture of 50 ml. of N,N-dimethylformamide and 75 ml. of toluene is added in portions 5.0 g. of a 53 percent suspension of sodium hydride in mineral oil while cooling in an ice-bath and stirring. Upon cessation of the hydrogen evolution, 10.0 g. of ethyl 2-bromo-isobutyrate in 50 ml. of toluene is added, and the resulting mixture is stirred at room temperature for eighteen hours. Most of the solvents are removed under reduced pressure and the oily residue is taken up into water. The organic material is extracted three times with diethyl ether; the ether solutions are combined, washed three times with 100 ml. portions of water and a saturated solution of sodium chloride in water, dried over sodium sulfate, filtered and evaporated to dryness under reduced pressure. The crude product is chromatographed on 300 g. of aluminum oxide (Woelm, neutral, activity III), and the ethyl 2-[4-(2-phenyl-2-propyl)phenyloxy]-isobutyrate is eluted wiht benzene, containing 15 percent of hexane after washing the column with hexane to remove the mineral oil. The colorless oil boils at 129–133°/0.03 mm.; yield: 4.0 g.

To a solution of 54.0 g. of crude ethyl 2-[4-(2-phenyl-propyl)-phenyloxy]-isobutyrate in 200 ml. of methanol is added a solution of 14.0 g. of potassium hydroxide pellets in 200 ml. of methanol; the clear solution is allowed to stand at room temperature for eighteen hours. The solvent is then removed under reduced pressure, and the resulting crude potassium salt of 2-[4-(2-phenyl-2-propyl)-phenyloxy]-isobutyric acid is dissolved in 300 ml. of water; the solution is extracted with diethyl ether and is then acidified with concentrated hydrochloric acid. The organic material is extracted twice with diethyl ether; the extracts are washed with water and a saturated aqueous solution of sodium chloride, dried over sodium sulfate, filtered and evaporated to dryness, to yield 42.0 g. of the crystalline 2-[4-(2-phenyl-2-propyl)-phenyloxy]-isobutyric acid, which is recrystallized from a mixture of benzene and pentane, M.P. 117–118°.

Example 2

A mixture of 11.0 g. of 2-{4-[2-(4-chloro-phenyl)-2-propyl]-phenyloxy}-isobutyric acid and 5.0 g. of 2-N,N-diethylaminoethyl chloride in 200 ml. of acetone containing 4.5 g. of anhydrous potassium carbonate is refluxed for eight hours. The liquid portion is decanted from the organic salts and evaporated under reduced pressure. The residues are shaken with 50 ml. of water and 50 ml. of diethyl ether. The aqueous phase is extracted with two additional portions of diethyl ether, and the combined ether extracts are washed with a saturated solution of sodium chloride in water, dried over sodium sulfate and evaporated to dryness to yield 12.4 g. of the oily 2-N,N-diethylamino-ethyl 2-{4-[2-(4-chloro-phenyl) - 2-propyl]-phenyloxy}-isobutyrate of the formula

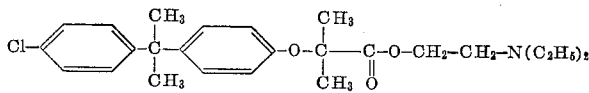

which is purified by distillation and collected at 187°/0.02 mm.

The starting material used in the above example is prepared as follows: To the ice-cooled Grignard reagent, prepared from 284.0 g. of methyl iodide and 48.6 g. of magnesium turnings in 550 ml. of diethyl ether, is added dropwise a solution of 154.6 g. of 4-chloro-acetophenone in 200 ml. of diethyl ether while stirring. The reaction mixture is allowed to stand at room temperature and is then heated to reflux for two hours. The Grignard complex is decomposed by slowly adding 300 ml. of a saturated aqueous solution of ammonium chloride and 300 ml. of water while stirring and cooling in an ice bath; 300 ml. of diethyl ether is added, and the organic layer is separated, washed and dried over sodium sulfate. The solvent is removed, and the 2-(4-chloro-phenyl)-2-propanol is obtained by distilling the residue, B.P. 92–96°/3 mm.

To a mixture of 28.2 g. of phenol and 6.7 g. of aluminum chloride (prepared by adding the latter in portions to the phenol while stirring) is given in portions a mixture of 17.1 g. of 2-(4-chloro-phenyl)-2-propanol and 9.4 g. of phenol while stirring and cooling with water. The reaction mixture is stirred at room temperature for two hours, allowed to stand for fifteen hours and is then heated for one hour to 40–50° while stirring. It is added to 100 ml. of 6 N aqueous hydrochloric acid while stirring; the organic layer is separated and the excess phenol is removed by distillation at temperatures up to 130°/13 mm. The oily residue is distilled to yield the 2-(4-chloro-phenyl)-2-(4-hydroxy-phenyl)-propane, which crystallizes from hexane, M.P. 72–74°.

To a solution of 12.3 g. of 2-(4-chloro-phenyl)-2-(4-hydroxy-phenyl)-propane in 50 ml. of N,N-dimethylformamide is added while stirring and cooling to 5°, 2.4 g. of a 53 percent suspension of sodium hydride in mineral oil. After the evolution of hydrogen ceases, 9.15 g. of ethyl 2-bromo-isobutyrate in 50 ml. of toluene is added. The reaction mixture is stirred for two hours at room temperature and then allowed to stand for 15 hours. The inorganic precipitate is filtered off, the filtrate is concentrated to a volume of about 25 ml. and is diluted with water. The organic material is extracted with diethyl ether, the organic extract is washed with saturated aqueous solutions of sodium hydrogen carbonate and sodium chloride, dried over sodium sulfate and evaporated to dryness. The oily residue is distilled, and the fraction collected at 135–145°/0.08 mm., yield: 120 g., is chromatographed on 480 g. of aluminum oxide (Woelm, neutral, activity III). The desired ethyl 2-{4-[2-(4-chloro-phenyl)-2-propyl]-phenyloxy}-isobutyrate is eluted with a 4:1-mixture of hexane and benzene and obtained as a clear, colorless oil; yield: 5.0 g.

A total of 6.0 g. of ethyl 2-{4-[2-(4-chloro-phenyl)-2-propyl]-phenyloxy}-isobutyrate is stirred into 40 ml. of methanol containing 1.4 g. of potassium hydroxide and the reaction mixture is allowed to stand at room temperature for four days. The solvent is then removed to yield the crude crystalline potassium salt of 2-{4-[2-(4-chloro-phenyl)-2-propyl]-phenyloxy}-isobutyric acid; the solubility of this salt in water is greater than 10 percent. A small portion of the salt is recrystallized by dissolving the crude material in boiling acetone, adding a small amount of methanol and cooling; it melts at about 290° (decomposition).

The above potassium salt is dissolved in 50 ml. of water; the solution is treated with 12 ml. of 2 N aqueous hydrochloric acid and the acidic solution is extracted three times with diethyl ether. The organic extracts are washed with a saturated solution of sodium chloride in water, dried over sodium sulfate, filtered, and evaporated to dryness. The 2-{4-[2-(4-chloro-phenyl)-2-propyl]-phenyloxy}-isobutyric acid is recrystallized by dissolving it in diethyl ether, adding hexane, evaporating the diethyl ether and diluting the solution with pentane, M.P. 91–92°; yield: 3.9 g.

colorless oil is eluted with benzene, which is dissolved in ethyl methyl ketone. This solution is combined with a solution of 1.65 g. of citric acid in 50 ml. of ethyl methyl ketone to yield 4.5 g. of the 2-(1-piperidino)-ethyl 2-{4-[4 - chloro - phenyl) - 2 - propyl] - phenyloxy} - isobutyrate citrate, which melts at 78–80° after recrystallization from boiling ethyl methyl ketone.

Example 6

The following compounds are prepared according to the previously-described procedure by selecting the appropriate starting materials:

| Starting Material | Reagents | Products |
|---|---|---|
| 2-[4-(2-phenyl-2-propyl)-phenyloxy]-isobutyric acid. | 2-N,N-dimethylamino-ethyl chloride hydrochloride plus sodium carbonate. | 2-N,N-dimethylamino-ethyl 2-[4-(2-phenyl-2-propyl)-phenyloxy]-isobutyrate. |
| Do | 3-N,N-dimethylamino-propyl chloride hydrochloride plus sodium carbonate. | 3-N,N-dimethylamino-propyl 2-[4-(2-phenyl-2-propyl)-phenyloxy]-isobutyrate. |
| Do | 2-(1-piperidino)-ethyl chloride hydrochloride plus sodium carbonate. | 2-(1-piperidino)-ethyl 2-[4-(2-phenyl-2-propyl) phenyloxy]-isobutyrate. |
| Do | 2-(4-morpholino)-ethyl chloride hydrochloride plus sodium carbonate. | 2-(4-morpholino)-ethyl-2-[4-(2-phenyl-2-propyl)-phenyloxy]-isobutyrate. |
| Do | 2-(4-methyl-1-piperazino)-ethyl chloride hydrochloride plus sodium carbonate. | 2-(4-methyl-1-piperazino)-ethyl 2-[4-(2-phenyl-2-propyl)-phenyloxy]-isobutyrate. |
| 2-[2-chloro-4-(2-phenyl-2-propyl)-phenyloxy]-isobutyric acid. | 2-N,N-diethylamino-ethyl chloride hydrochloride plus sodium carbonate. | 2-N,N-diethylamino-ethyl 2-[2-chloro-4-(2-phenyl-2-propyl)-phenyloxy]-isobutyrate. |
| 2-{4-[2-(4-chloro-phenyl)-2-propyl]-phenyloxy}-isobutyric acid. | 2-(1-pyrrolidino)-ethyl chloride hydrochloride plus sodium carbonate. | 2-(1-pyrrolidino)-ethyl 2-{4-[2-(4-chloro-phenyl)-2-propyl]-phenyloxy}-isobutyrate. |
| 2-{4-[2-(4-methyl-phenyl)-2-propyl]-phenyloxy}-isobutyric acid. | 2-N,N-dimethylamino-2-methyl-ethyl chloride hydrochloride plus potassium carbonate. | 2-N,N-dimethylamino-2-methyl-ethyl 2-{4-[2-(4-methyl-phenyl)-2-propyl]-phenyloxy}-isobutyrate. |
| 2-[2,6-dichloro-4-(2-phenyl-2-propyl)-phenyloxy]-isobutyric acid. | 2-N,N-diethylamino-ethyl chloride hydrochloride plus sodium carbonate. | 2-N,N-diethylamino-ethyl 2-[2,6-dichloro-4-(2-phenyl-2-propyl)-phenyloxy]-isobutyrate. |
| 2-{2-chloro-4-[2-(4-chloro-phenyl)-2-propyl]-phenyloxy}-isobutyric acid. | 2-(1-pyrrolidino)-ethyl chloride hydrochloride plus sodium carbonate. | 2-(1-pyrrolidino)-ethyl 2-{2-chloro-4-[2-(4-chloro-phenyl)-2-propyl]-phenyloxy}-isobutyrate. |
| 2-[4-(3-phenyl-3-pentyl)-phenyloxy]-isobutyric acid. | 2-N,N-diethylamino-ethyl chloride hydrochloride plus sodium carbonate. | 2-N,N-diethylaminoethyl 2-[4-(3-phenyl-3-pentyl)-phenyloxy]-isobutyrate. |
| 2-methyl-2-[4-(2-phenyl-2-propyl)-phenyloxy]-butyric acid. | 2-(1-piperidino)-ethyl chloride hydrochloride plus sodium carbonate. | 2-(1-piperidino)-ethyl 2-methyl-2-[4-(2-phenyl-2-propyl)-phenyloxy]-butyrate. |
| 2-[4-(1-phenyl-1-cyclohexyl)-phenyloxy]isobutyric acid. | 2-N,N-diethylaminoethyl chloride hydrochloride plus sodium carbonate. | 2-N,N-diethylaminoethyl 2-[4-(1-phenyl-1-cyclohexyl)-phenyloxy]-isobutyrate. |
| 1-[4-(2-phenyl-2-propyl)-phenyloxy]-cyclohexane carboxylic acid. | 3-(1-piperidino)-propyl chloride hydrochloride plus sodium carbonate. | 3-(1-piperidino)-propyl 1-[4-(2-phenyl-2-propyl)-phenyloxy]-cyclohexane carboxylate. |

Example 3

A solution of 1.14 g. of 2-N,N-diethylaminoethyl 2-{4-[2-(4-chloro-phenyl)-2 - propyl]-phenyloxy} - isobutyrate in ethyl methyl ketone is added to a solution of 0.55 g. of citric acid in the same solvent. The resulting crystalline 2-N,N-diethylamino - ethyl 2-{4-[2-(4-chloro-phenyl)-2-propyl]-phenyloxy}-isobutyrate citrate (yield: 1.6 g.) is recrystallized from boiling ethyl methyl ketone, M.P. 133–134°.

Example 4

A solution of 0.7 g. of 2-N,N-diethylaminoethyl 2-{4-[2 - (4 - chloro-phenyl)-2-propyl]-phenloxy}-isobutyrate and 0.156 g. of methane sulfonic acid in acetone is evaporated to dryness; the oily residue crystallizes under diethyl ether to yield the 2-N,N-diethylaminoethyl 2-{4-[2-(4-chloro-phenyl)-2-propyl]-phenyloxy}-isobutyrate methane sulfonate, M.P. 78–92°. Two additional precipitations from diethyl ether do not yield a product with an improved melting point.

Example 5

A mixture of 11.0 g. of 2-{4-[2-(4-chloro-phenyl)-2-propyl]-phenyloxy}-isobutyric acid, 10.0 g. of 2-(1-piperidino)-ethyl chloride hydrochloride and 9.0 g. of anhydrous potassium carbonate in 200 ml. of acetone is refluxed for eight hours while stirring. The reaction mixture is worked up as described in Example 2 to yield 8.4 g. of the crude 2-(1-piperidino)-ethyl 2-{4-[2-(4-chloro-phenyl)-2-propyl]-phenyloxy}-isobutyrate of the formula

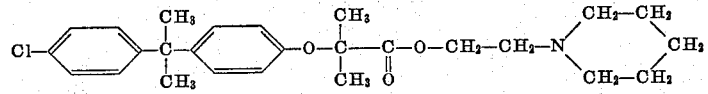

which is purified by chromatography on 252 g. of aluminum oxide (neutral, activity III). A total of 3.4 g. of a The starting materials used in the above examples are usually prepared by converting the corresponding compound of the formula $Ph_1-C(R_1)(R_2)-Ph_2-OH$, in in which $Ph_1$, $Ph_2$, $R_1$ and $R_2$ have the previously-given meaning, into an alkali metal salt, particularly the sodium salt, for example, by treatment with an alkali metal hydride or amide, e.g. a 53 percent sodium hydride suspension, in the presence of toluene, reacting the resulting salt with the appropriate lower alkyl ester of an acid of the formula $Hal-C(R_3)(R_4)-C(=O)-OH$, in which $R_3$ and $R_4$ have the previously-given meaning, and Hal is particularly chloro or bromo, and hydrolyzing the resulting ester compound of the formula $$Ph_1-C(R_1)(R_2)-Ph_2-O-C(R_3)(R_4)$$
$$-C(=O)-O\text{-lower alkyl}$$

in which $Ph_1$, $Ph_2$, $R_1$, $R_2$, $R_3$ and $R_4$ have the previously-given meaning, and the lower alkyl is especially methyl or ethyl, to form the desired starting material of the formula $$Ph_1-C(R_1)(R_2)-Ph_2-O-C(R_3)(R_4)-C(=O)-OH$$

in which $Ph_1$, $Ph_2$, $R_1$, $R_2$, $R_3$ and $R_4$ have the previously-given meaning.

What is claimed is:

1. A member selected from the group consisting of a compound having the formula:

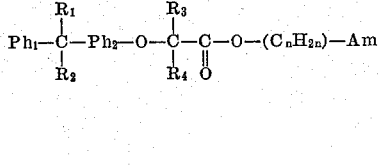

in which $Ph_1$ is a member selected from the group consisting of phenyl, (lower alkyl)-phenyl, (halogeno)- phenyl, and (trifluoromethyl)-phenyl, each of $R_1$, $R_2$, $R_3$ and $R_4$ are lower alkyl, $Ph_2$ is a member selected from the group consisting of 1,4-phenylene, (lower alkyl)-1,4-phenylene, (halogeno)-1,4-phenylene and (trifluoromethyl)-1,4-phenylene, —$(C_nH_{2n})$— is lower alkylene separating Am from the oxygen atom by at least 2 carbon atoms and Am is a member selected from the group consisting of di-lower alkylamino, N-cycloalkyl-N-lower alkylamino in which cycloalkyl has 5 to 6 ring-carbon atoms, N-lower alkyl-N-phenyl-lower alkylamino, N-hydroxy-lower alkyl-N-lower alkyl-amino and di-(hydroxy-lower alkyl)-amino in which hydroxy is separated from the nitrogen atom by at least 2 carbon atoms, alkyleneimino with 4 to 8 carbon atoms, aza-alkyleneimino and N-lower alkyl-aza-alkyleneimino in which alkylene has 4 to 6 carbon atoms separating both nitrogens by at least 2 carbon atoms, 4-morpholino and 4-thiamorpholino, its N-oxide, lower alkyl quaternaries, phenyl-lower alkyl quaternaries and pharmaceutically acceptable acid addition salts.

2. A member selected from the group consisting of the compound of the formula:

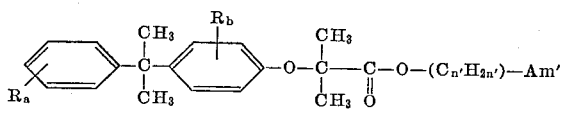

in which each of the groups $R_a$ and $R_b$ is a member selected from the group consisting of hydrogen, and halogeno, the group of the formula —$(C_{n'}H_{2n'})$— is lower alkylene having from two to three carbon atoms and separating the group Am' from the oxygen atom by two to three carbon atoms, and Am' is a member selected from the group consisting of di-lower alkylamino and alkyleneimino having from five to seven ring members, and a pharmaceutically acceptable acid addition salt thereof.

3. A member selected from the group consisting of the compound of the formula:

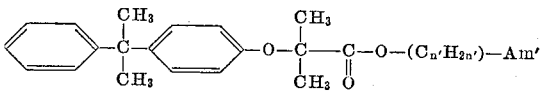

which the group of the formula —$(C_{n'}H_{2n'})$— is lower alkylene having from two to three carbon atoms and separating the group Am' from the oxygen atom by two to three carbon atoms, and Am' is a member selected from the group consisting of di-lower alkylamino and alkyleneimino having from five to seven ring members, and pharmaceutically acceptable acid addition salt thereof.

4. A member selected from the group consisting of the compound of the formula:

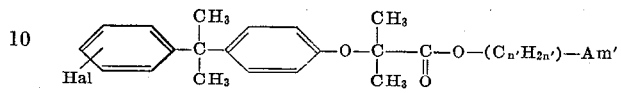

in which the group of the formula —$(C_{n'}H_{2n'})$— is lower alkylene having from two to three carbon atoms and separating the group Am' from the oxygen atom by two to three carbon atoms, and Am' is a member selected from the group consisting of di-lower alkylamino and alkyleneimino having from five to seven ring members, and Hal is halogeno, and a pharmaceutically acceptable acid addition salt thereof.

5. A member selected from the group consisting of the 2-diethylaminoethyl 2-[4-(2-phenyl-2-propyl)-phenyloxy]-isobutyrate, and a pharmaceutically acceptable acid addition salt thereof.

6. A member selected from the group consisting of the 2-diethylaminoethyl 2-{4-[2-(4-chloro-phenyl)-2-propyl]-phenyloxy}-isobutyrate, and a pharmaceutically acceptable acid addition salt thereof.

7. A member selected from the group consisting of the 2-(1,piperidino)-ethyl 2-{4-[2-(4-chloro-phenyl)-2-propyl]-phenyloxy}-isobutryate, and a pharmaceutically acceptable acid addition salt thereof.

References Cited

UNITED STATES PATENTS 3,120,551  2/1964  Goldschmidt _____ 260—294.3

FOREIGN PATENTS 860,303  2/1961  Great Britain.

WALTER A. MODANCE, *Primary Examiner.*

AVROM D. SPEVACK, *Assistant Examiner.*